United States Patent [19]

Usui et al.

[11] Patent Number: 4,770,894

[45] Date of Patent: Sep. 13, 1988

[54] DECOLORIZED OYSTER EXTRACT CONCENTRATE

[75] Inventors: Koichi Usui, Tokyo; Masahide Ogawa, Shibata; Kiyoshi Takai, Kawasaki; Teiji Sato; Masanori Tanaka, both of Shibata; Izumi Serizawa, Tokyo, all of Japan

[73] Assignee: Mizusawa Industrial Chemicals, Ltd., Tokyo, Japan

[21] Appl. No.: 4,573

[22] Filed: Jan. 20, 1987

[30] Foreign Application Priority Data

Jan. 17, 1986 [JP] Japan ................................ 61-6371
Mar. 25, 1986 [JP] Japan ............................... 61-64820

[51] Int. Cl.$^4$ ...................... A22C 29/02; A23L 1/221
[52] U.S. Cl. .................................. 426/655; 426/650; 426/422; 426/423; 426/330
[58] Field of Search ............... 426/655, 422, 423, 330, 426/650

[56] References Cited

U.S. PATENT DOCUMENTS

| 66,732 | 7/1867 | Noble | 426/655 |
|---|---|---|---|
| 1,155,743 | 10/1915 | Lehritter | 426/655 X |
| 3,734,734 | 5/1973 | Halpern | 426/330 X |
| 3,940,498 | 2/1976 | Butterworth et al. | 426/423 |
| 4,466,986 | 8/1984 | Guggenbuehler et al. | 426/422 X |
| 4,684,530 | 8/1987 | Welsh et al. | 426/423 X |

FOREIGN PATENT DOCUMENTS

| 0018381 | 5/1985 | Japan | 426/655 |
|---|---|---|---|
| 60-087769 | 5/1985 | Japan | 426/655 |
| 60-160858 | 8/1985 | Japan | 426/655 |
| 61-081763 | 4/1986 | Japan | 426/423 |
| 61-119165 | 6/1986 | Japan | 426/650 |

Primary Examiner—Joseph Golian
Attorney, Agent, or Firm—Sherman and Shalloway

[57] ABSTRACT

A decolorized oyster extract concentrate is formed by an adsorption purification treatment using a specific inorganic lamellar magnesium phyllosilicate compound and a concentration treatment. Coloring components can be effectively removed without substantial reduction of the contents of taste components and nutrients. The decolorized oyster extract concentrate is very valuable as a seasoning or healthy food.

9 Claims, 4 Drawing Sheets

DECOLORIZED OYSTER EXTRACT CONCENTRATE

BACKGROUND OF THE INVENTION

1. Field of the Invention

The present invention relates to a decolorized oyster extract concentrate. More particularly, the present invention relates to a decolorized oyster extract concentrate which is excellent in the hue and taste and is valuable as a base or additive of a natural seasoning or as a food.

2. Description of the Prior Art

An oyster extract contains large amounts of flavor components such as glutamic acid and flavor-enhancing components such as glycogen, and an oyster extract obtained by concentrating a soup formed as a by-product in the production of canned oysters is used as a natural seasoning called "oyster sauce". Moreover, since the oyster extract contains ingredients effective for recovering and maintaining functions of the human body, a concentrated and dried product of the oyster extract is marketed as a healthy food.

However, the oyster extract concentrate contains relatively large amounts of black and blackish brown components and has an appearance resembling that of soy sauce or Worcester sauce and therefore, is not suitable for seasoning foods in which coloration is disliked. Furthermore, the concentration containing such black or blackish brown components has a taste or smell not desirable for a seasoning, while gives a bitterness, astringency or scorching smell, and the entire taste of the concentrate is heavy and greasy. Accordingly, the conventional oyster extract is used for cooked foods such as frizzled foods and broiled foods but not used for light-taste foods such as soup, clear soup, boiled foods and salads.

Although various methods for separating such black and blackish brown components from the oyster extract have been examined and tried, since these coloring components are stably dispersed in the liquid, separation by adsorption or the like is very difficult.

In separating and removing the coloring components, it is important that the contents of flavor components or nutrients contained in the oyster extract should not be reduced. A refining agent, such as an adsorbent, capable of satisfying this requirement has not been developed.

SUMMARY OF THE INVENTION

It is therefore a primary object of the present invention to provide a decolorized oyster extract concentrate in which black and blackish brown components are effectively removed without reduction of contents of taste components or nutrients contained in the oyster extract.

In accordance with the present invention, there is provided a decolorized oyster extract concentrate comprising as indispensable components amino acids, proteins and saccharides and having a solid content of at least 5% by weight, wherein the integrated absorbance S represented by the following formula:

$$S = \int_{400}^{800} \epsilon(x)dx$$

wherein $\epsilon(x)$ represents the absorbance at a wavelength of x nm, determined by using a cell having a thickness of 10 mm with respect to an aqueous solution having a solid concentration of 5% by weight, is not larger than 200.

This decolorized oyster extract is prepared by a process comprising subjecting an oyster extract having a solid concentration not higher than 30% by weight to an adsorption purification treatment with an adsorbent composed mainly of a water-insoluble inorganic magnesium compound, which has a specific surface area of at least 50 $m^2/g$, and concentrating the refined liquid in a substantially non-oxidizing atmosphere so that the solid concentration is at least 5% by weight.

While we were making research leading to the present invention, we found the following interesting fact.

When the oyster extract is concentrated, at an initial stage where the solid concentration is low, black or blackish components are hardly present or, if present, the amounts are very small, and in an oxidizing atmosphere, as the solid concentration exceeds 10% by weight with advance of the concentration, the contents of the black or blackish brown components are drastically increased, or in a non-oxidizing atmosphere, if the solid concentration exceeds 30% by weight, coloration becomes conspicuous. As pointed out hereinbefore, if the contents of the coloring components are thus increased, removal of these coloring components by conventional refining means such as an adsorption treatment is very difficult. It is construed that the reason is that several components contained in the oyster extract are mutually reacted or condensed with one another during the concentration to form coloring components having a relatively high molecular weight.

Namely, it is considered that formation of such black and blackish brown components is due to a browning or blacking reaction called "Maillard reaction" generally caused between amino group-containing compounds such as amino acids, amines and proteins and saccharides or carbonyl compounds in processing or storage of foods.

In heating processing of foods, the reactivity of reduced sugar is increased, and the Maillard reaction caused by reduced sugar results in reduction of nutritive values of foods and deterioration of taste components. Accordingly, control of the Maillard reaction is an especially important problem in processing and storage of foods.

The present invention is based on the finding that if an oyster extract is treated with an adsorbent composed mainly of an inorganic magnesium compound having a specific surface area of at least 50 $m^2/g$, for example, lamellar magnesium phyllosilicate, at a stage before formation of large quantities of the above-mentioned coloring components, precursors of the black and blackish brown coloring components can be effectively removed without substantial reductions of the contents of flavor components or nutrients.

According to the present invention, since precursors of the coloring substances are removed, if the refined liquid obtained by the above-mentioned treatment is concentrated to a high solid concentration, coloring substances are not formed and a concentrate excellent in the hue, taste and flavor can be obtained.

The reason why the above-mentioned inorganic magnesium compound specifically adsorbs and removes the precursors of the coloring substances in the present invention has not completely been elucidated, but it is construed that this effect is attained by not only physical adsorption but also chemical adsorption (including ion adsorption) and control of the above-mentioned browning reaction. The fact that these three factors participate in attainment of the above-mentioned effect coincides with the fact that the water-insoluble inorganic magnesium compound exhibits only a very low adsorbing property to the coloring components formed during the concentration.

Figure 2:
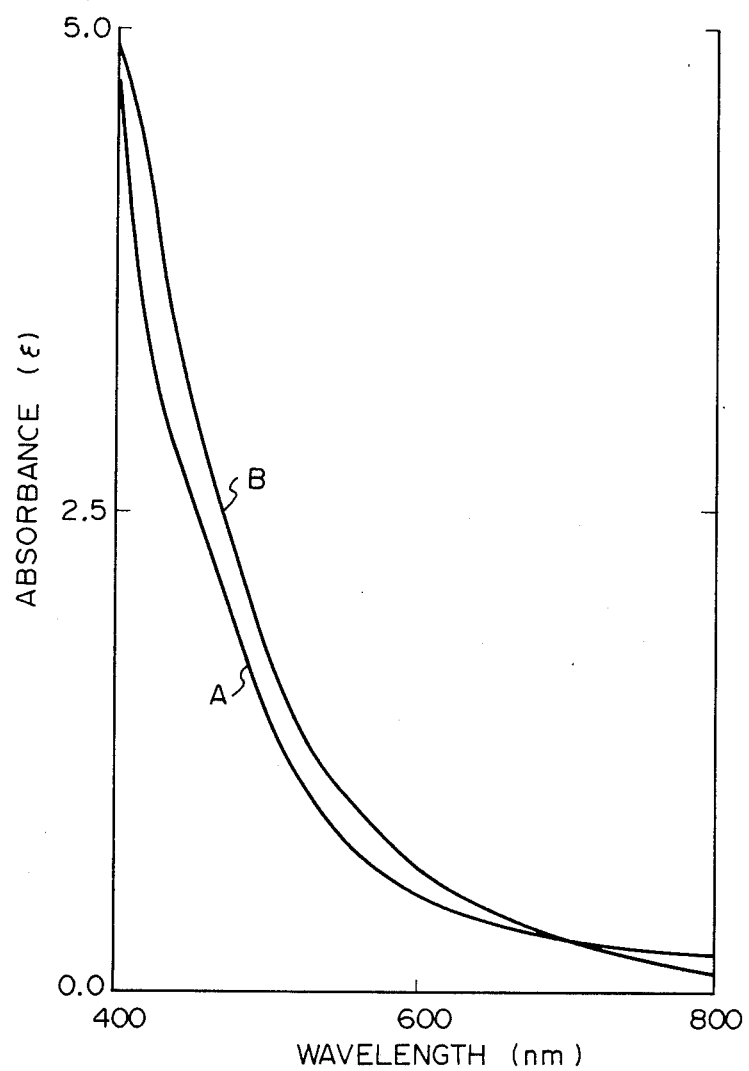

Curve A of FIG. 2 shows a visible region absorption spectrum of the starting oyster extract used in the examples of the present invention, and curve B shows a visible region absorption spectrum of an oyster extract concentrate prepared in Comparative Example 1.

Figure 3:
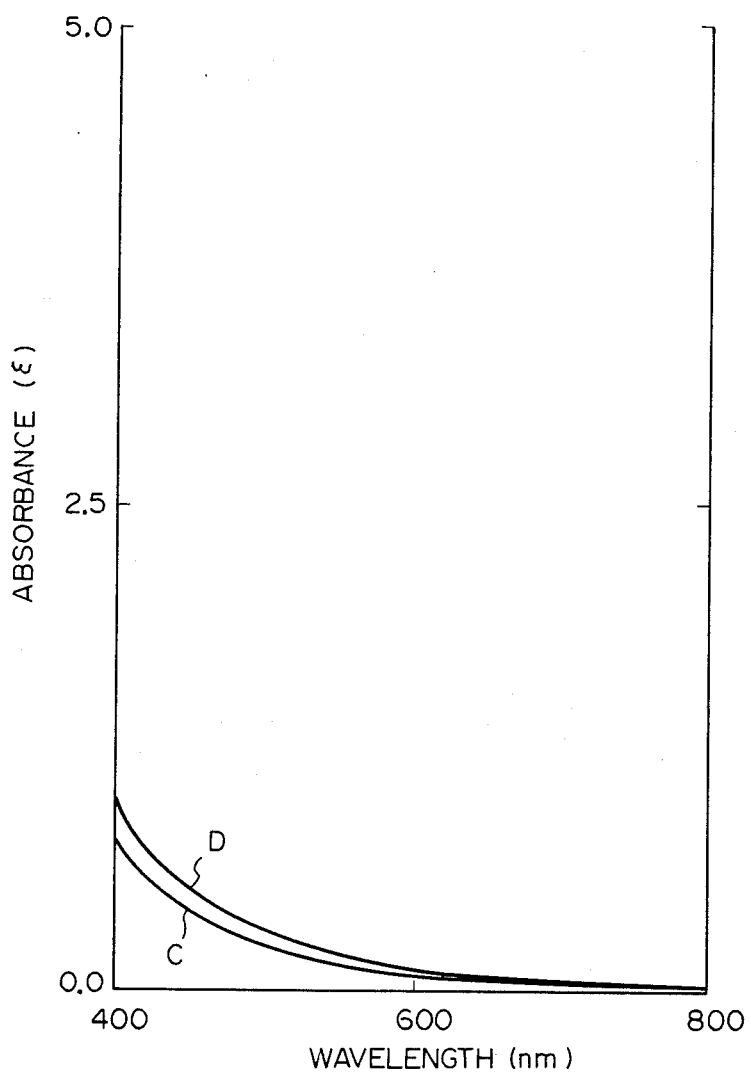

Curve C of FIG. 3 shows a visible region absorption spectrum of a refined oyster extract obtained at the adsorption refining treatment step (first step) of Example 3 of the present invention, and curve D of FIG. 3 shows a visible absorption spectrum of an oyster extract concentrate obtained by subjecting the refined oyster extract to the concentration treatment (second step) in Example 3 of the present invention.

Figure 4:
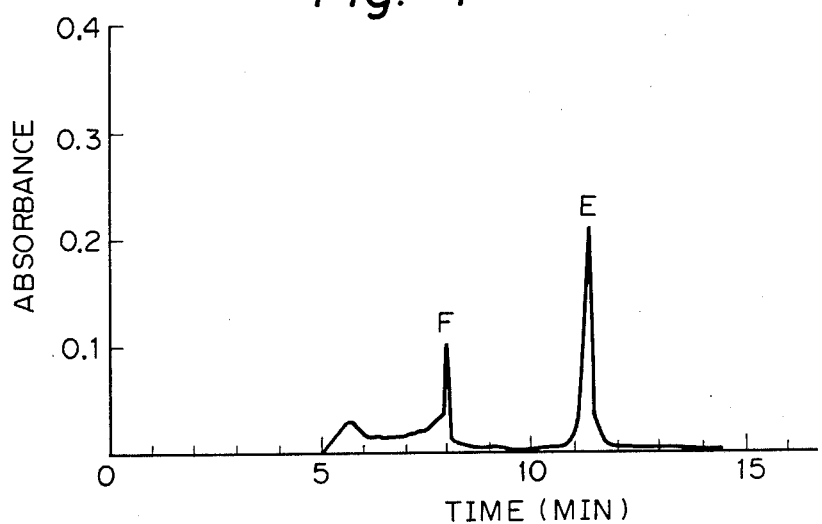

FIG. 4 is a high speed liquid chromatogram of a refined oyster extract obtained at the first step of Comparative Example 3, which was obtained by using water as the developing liquid.

Figure 5:
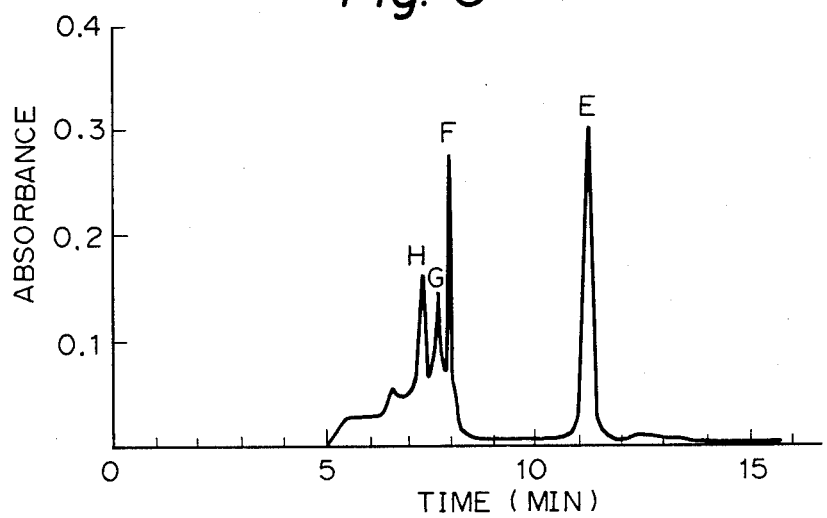

FIG. 5 is a high speed liquid chromatogram of a refined oyster extract obtained at the first step of Example 3, which was obtained by using water as the developing liquid.

DETAILED DESCRIPTION OF THE PREFERRED EMBODIMENTS

(A) Preparation of Decolorized Oyster Extract Concentrate (a) Starting Oyster Extract An oyster soup or a partial concentrate thereof is advantageously used as the starting oyster extract. The starting oyster extract has a solid concentration of 2 to 30% by weight, preferably 3 to 15% by weight. If the solid concentration is too high and exceeds the above-mentioned range, the contents of black or blackish brown coloring components in the starting extract are increased and no good results can be obtained. If the solid concentration is too low and below the above-mentioned range, a large quantity of the liquid should be treated and the process becomes economically disadvantageous. An oyster extract obtained by treating ground meat of oysters under actions of heat and water can be used as the starting oyster extract, as well as the above-mentioned oyster extract. Moreover, a desalted extract obtained by subjecting the above-mentioned starting oyster extract to a desalting operation using an ion exchange membrane can be used.

Contents of ingredients in 100 g of a dry oyster extract as an example of the starting oyster extract are shown in Table 1.

TABLE 1

| General Components | |
|---|---|
| Calorific value | 354 cal |
| Water | 2.6 g |
| Proteins | 38.1 g |

TABLE 1-continued

| | |
|---|---|
| Lipids | 0.2 g |
| Ash | 9.2 g |
| Fibers | 0 g |
| Carbohydrates (sugars) | 49.9 g |
| Amino Acid Compositions | |
| Essential Amino Acids | |
| Isoleucine | 0.96 g |
| Leucine | 1.56 g |
| Lysine | 1.98 g |
| Methionine | 0.63 g |
| Phenylalanine | 0.86 g |
| Threonine | 1.30 g |
| Tryptophane | 0.22 g |
| Valine | 1.24 g |
| Cystine | 0.36 g |
| Tyrosine | 0.74 g |
| Alginine | 1.82 g |
| Hystidine | 0.63 g |
| Alanine | 1.85 g |
| Aspartic acid | 2.98 g |
| Glutamic acid | 4.25 g |
| Glycine | 1.95 g |
| Proline | 2.53 g |
| Serine | 1.15 g |
| Inorganic Substances | |
| Calcium | 115 mg |
| Phosphorus | 552 mg |
| Manganese | 2.28 mg |
| Magnesium | 241 mg |
| Sodium | 1860 mg |
| Potassium | 1410 mg |
| Cobalt | 14 μg |
| Iron | 5.30 mg |
| Copper | 1.9 mg |
| Zinc | 40.2 mg |
| Iodine | 0.6 mg |
| Vitamins | |
| Vitamin B$_2$ | 1.67 mg |
| Vitamin B$_6$ | 0.43 mg |
| Vitamin B$_{12}$ | 34 μg |
| Vitamin H (biotin) | 27 μg |
| Inositol | 93 mg |
| Choline | 280 mg |
| Valuable Ingredients | |
| Taurine | 4.2 g |
| Glycogen | 27 g |
| Phospholipid | 10 mg |

(b) Adsorption Purification Treatment

In the present invention, an adsorbent composed mainly of a water-insoluble inorganic magnesium compound, which has a specific surface area of at least 50 m$^2$/g, especially 100 to 800 m$^2$/g, is used for the adsorption purification treatment of the above-mentioned starting oyster extract. A magnesium compound having a specific surface area smaller than 50 m$^2$/g is inferior to the magnesium compound used in the present invention in the property of adsorbing precursors of coloring components. It is important that this inorganic magnesium compound should be substantially insoluble in water. A water-soluble compound is not preferred from the viewpoint of the flavor of the concentrate.

Silicates, carbonates, partial acid adducts and partial hydroxides of magnesium, which are lowly crystalline and have a large specific surface area, are preferred as the water-insoluble inorganic magnesium compound having a high adsorbing capacity, that is used in the present invention.

Magnesium silicate obtained by the hydrothermal treatment of a silicic acid component and an oxide and/or hydroxide of magnesium, which has a composition represented by the following formula:

$MgO.mSiO_2.nH_2O$ wherein m is a number of from 0.5 to 2 and n is a number of at least 2, and a specific surface area of at least 100 m²/g, is preferably used, and magnesium silicate in which m in the above-mentioned composition formula is 4/3 is especially preferred.

The most preferred magnesium silicate (m=4/3) is a water-insoluble mineral composed of lamellar magnesium phyllosilicate, which is represented by the following structural formula:

$$(Mg_3)(SiO_2)_2(OH)_2 \cdot xH_2O (x \leq 5)$$

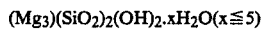

and has X-ray diffraction peaks at spacings of 4.5–4.6 Å, 2.5–2.6 Å and 1.5–1.6 Å and a specific surface area of at least 300 m²/g. This lamellar phyllosilicate mineral can be synthesized by using as the starting silicic acid component active silicic acid or active aluminosilicic acid obtained by the acid treatment of (1) amorphous silica such as synthetic silicic acid, natural diatomaceous earth or ferrosilicon dust, (2) crystalline silica such as calcined diatomaceous earth or siliceous stone or (3) a clay mineral, or (4) a compound capable of forming silica under reaction conditions and as the starting magnesium component an oxide or hydroxide of magnesium or a compound capable of forming an oxide or hydroxide of magnesium, mixing both the components in an aqueous medium and subjecting the resulting slurry to a hydrothermal treatment under atmospheric or elevated pressure. The reaction is carried out at a temperature of 80° to 200° C., and at this temperature, the pressure of the reaction system is maintained at 0.5 to 16 Kg/cm². The reaction time is changed according to the temperature and pressure, but a reaction time of 0.5 to 10 hours is preferred. The product is washed with water according to need and is subjected to post treatments such as drying, pulverization and classification, whereby a water-insoluble white powdery adsorbent is obtained.

Figure 1:
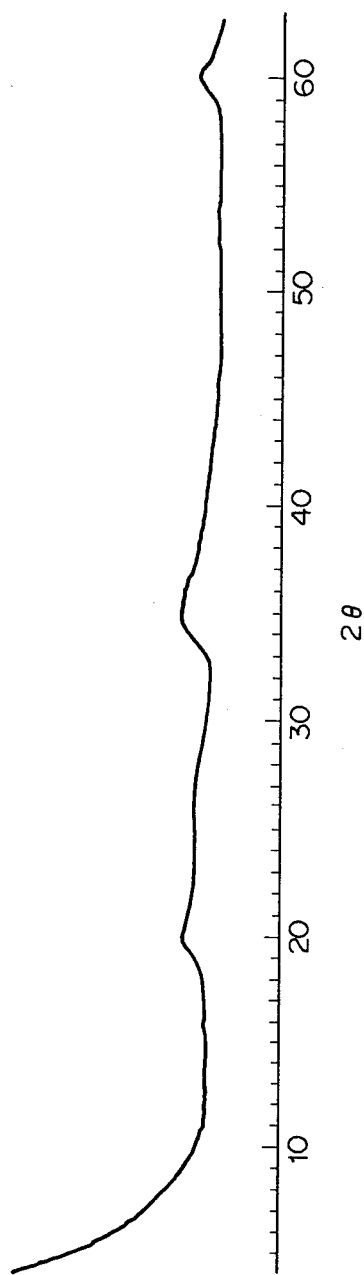
FIG. 1 is a diagram illustrating an X-ray diffraction pattern of synthetic lamellar magnesium phyllosilicate used as the adsorbent most suitably for the production of the decolorized oyster extract concentrate.

As is inferable from the structural formula of $(Mg_3)(Si_2O_5)_2(OH)_2 \cdot xH_2O$ ($x \leq 5$), the so-obtained synthetic magnesium phyllosilicate has a structure resembling the structure of talc which is a natural clay mineral. Namely, the magnesium phyllosilicate has mainly a three-layer structure comprising an octahedral layer (brucite layer) of $MgO_6$ sandwiched between two tetrahedral layers (phyllosilicic acid layers) of $SiO_4$, and has X-ray diffraction patterns characteristic of this lamellar structure. FIG. 1 shows an X-ray diffraction pattern of the synthetic lamellar magnesium phyllosilicate used most preferably in the present invention. It is obvious that the magnesium phyllosilicate has diffraction patterns at spacings of 4.5–4.6 Å (corresponding to planes (020) and (110)), 2.5–2.6 Å (corresponding to plane (200)) and 1.5–1.6 Å (corresponding to plane (060)). These X-ray diffraction patterns are common to natural trioctahedral lamellar clay minerals.

The synthetic lamellar magnesium silicate used in the present invention has a very large specific surface area and a very high adsorbing power, not observed in natural phyllosilicates such as talc. This is due to the fact that the synthetic magnesium phyllosilicate is lowly crystalline, as is apparent from broad shapes of the X-ray diffraction peaks, and crystallites are fine and lamination of the layers is irregular. Therefore, the lamellar structure of the magnesium phyllosilicate is considered to allow other substances to intrude between the adjacent layers.

The adsorbent used in the present invention, which is composed mainly of the above-mentioned inorganic magnesium compound, may be used in the powdery state, but in order to facilitate solid-liquid separation after the adsorption treatment, it is preferred that the adsorbent powder be molded with water, if necessary, together with a water-insoluble sticky mineral such as acid clay, kaolin or bentonite, and the molded body be caked by drying or calcination and the resulting granular or other molded body be used for the adsorption treatment. It is preferred that the inorganic magnesium compound be added to the oyster extract in an amount of 0.5 to 20% by weight, especially 1 to 15% by weight, based on the oyster extract. If the amount of the inorganic magnesium compound is too small and below the above-mentioned range, removal of precursors of coloring substances is insufficient, and if the amount of the inorganic magnesium compound is too large and exceeds the above-mentioned range, substantial amounts of flavor components or nutrients are adsorbed and removed and the intended object of the present invention is not attained.

In the present invention, the inorganic magnesium compound alone may be used as the adsorbent, or it may be used in combination with other adsorbent such as active clay, acid clay, silica, alumina, silica-alumina, zeolite and active carbon. The combination of the inorganic magnesium compound with active carbon is especially preferred because precursors of coloring components can be most effectively adsorbed and removed without substantial reduction of the contents of flavor components.

In the case where the inorganic magnesium compound is singly used, a considerably large amount of the inorganic magnesium compound should be used for complete removal of precursors of coloring components, and considerable adsorption of taste components is inevitably caused. Although active carbon is considerably effective for removal of precursors of coloring components, active carbon is fatally defective in that active carbon simultaneously adsorbs flavor components and drastically reduces the contents of flavor components. If both are used in combination, precursors of coloring components can be effectively removed without substantial reduction of the contents of flavor components. In this case, it is preferred that the inorganic magnesium compound be used in an amount of 0.5 to 20% by weight, especially 1 to 15% by weight, based on the oyster extract and active carbon be used in an amount of 0.1 to 5% by weight, especially 0.2 to 3% by weight, based on the oyster extract. It is especially preferred that the weight ratio of the inorganic magnesium compound to active carbon be from 2/1 to 10/1. It is preferred that the starting oyster extract be contacted simultaneously with the inorganic magnesium compound and active carbon. However, there may be adopted a method in which the oyster extract is first contacted with active carbon and then with the inorganic magnesium compound, or the reverse contact order may be adopted.

The conditions for the contact of the starting oyster extract with the adsorbent are not particularly critical, so far as precursors of coloring components are sufficiently adsorbed and removed. However, it is ordinarily preferred that the contact be carried out at a temperature of 0° to 100° C. for at least 1 minute. The contact treatment at room temperature is especially advantageous. The adsorption treatment can be accomplished according to known adsorption refining methods, for example, a method in which the powdery adsorbent is added to the oyster extract, the mixture is stirred for a predetermined time and the adsorbent is separated by filtration, and a method in which the oyster extract is passed through a column packed with the adsorbent to effect the adsorption treatment.

(c) Concentration Treatment

In the present invention, the refined liquid coming from the adsorption treatment step is concentrated in a substantially non-oxidizing atmosphere so that the solid concentration is at least 5% by weight. At the concentration treatment, it is preferred that water be effectively evaporated at a temperature as low as possible, and for this purpose, reduced pressure concentration or vacuum concentration is suitable. Of course, azeotropic distillation using a solvent can be adopted. Moreover, evaporation distillation using an inert gas, for example, nitrogen, as the carrier gas may be adopted. A multi-staged concentrating vessel may be used for performing the concentration efficiently.

A viscous liquid or pasty product is obtained as the concentrate, or the obtained concentrate may be formed into a powdery or granular product by adoption of drying means such as freeze drying or spray drying. Furthermore, by utilizing the stickiness of the concentrate or together with a food binder such as a polysaccharide, the concentrate may be molded into a sheet, a flake or a cake.

(B) DECOLORIZED OYSTER EXTRACT CONCENTRATE

The so-obtained decolorized oyster extract concentrate of the present invention comprises amino acids, proteins and saccharides as indispensable components and has a solid content of at least 5% by weight, and the concentrate is characterized in that the integrated absorbance represented by the following formula:

$$S = \int_{400}^{800} \epsilon(x)dx$$

wherein $\epsilon(x)$ represents the absorbance at a wavelength of x nm, determined by using a cell having a thickness of 10 mm with respect to an aqueous solution having a solid concentration of 5% by weight, is not larger than 200.

The integrated absorbance S means the optical integration quantity of all the substances having absorptions over the visible wavelength region of form 400 to 800 nm, and the value S is in an inverse relation to the transparency of the liquid. Conventional oyster extract concentrates have ordinarily an integrated absorbance S larger than 400 and even partial concentrates have ordinarily an integrated absorbance S larger than 250. In contrast, the concentrate of the present invention has an integrated absorbance not larger than 200, and even in the case where the refined liquid is concentrated so that the solid concentration is at least 40% by weight, the integrated absorbance is not larger than 150.

FIG. 2 shows visible region absorption spectra of the starting oyster extract and the conventional concentrate, and FIG. 3 shows visible region absorption spectra of the oyster extract refined by the adsorption refining treatment using the specific adsorbent according to the present invention and the concentrate thereof. From these spectra, it is seen that in the concentrate according to the present invention, the content of components having absorptions on the short wavelength side are drastically reduced and increase of the contents of these components by the concentration is prominently controlled.

The concentrate of the present invention is characterized in that the coloring components are removed and simultaneously, components giving a bad taste or bad smell are removed, and that taste and seasoning components in the oyster extract are present in the highly concentrated state.

Although the fact that the oyster extract concentrate of the present invention has a gentle, mellow, delicious flavor and taste is proved only by the organoleptic test described hereinafter, the fact that the oyster extract of the present invention contains effective components other than the above-mentioned undesirable components at high concentration can be proved by the chromatography. FIGS. 4 and 5 are high speed liquid chromatograms obtained by adjusting the solid concentration to 5% by weight in a refined liquid (FIG. 4) formed by treating the starting oyster extract with active carbon alone so that the integrated absorbance is about 70 and a refined liquid (FIG. 5) formed by treating the starting oyster extract with lamellar magnesium phyllosilicate and active carbon so that the integrated absorbance is about 70, and subjecting the refined liquids to the high speed liquid chromatography using water as the developing liquid and gel G2500 PWXL supplied by Toyo Soda as the column. From these chromatograms, it is seen that in the concentrate of the present invention, the effective components in the oyster extract are retained at high concentrations. In the chromatogram of FIG. 5, the peak E is a peak inherent to leucine and/or isoleucine, the peak F is a peak inherent to glutamic acid and/or succinic acid, and the peaks G and H are peaks inherent to other flavor components (deemed to be other amino acids and/or water-soluble low-molecular-weight protein components). It must be noted that these peaks in FIG. 5 are much higher than corresponding peaks in FIG. 4.

(C) COMPOSITE SEASONING COMPOSITION

According to the present invention, a composite seasoning composition can be provided by subjecting a mixture of the above-mentioned starting oyster extract and an adjuvant extract to the above-mentioned adsorption refining and concentration treatments.

More specifically, in accordance with another aspect of the present invention, there is provided a composite seasoning composition comprising (i) an oyster extract formed from natural or raised oysters and (ii) at least one adjuvant extract selected from the group consisting of extracts of fishery products, seaweeds, chicken bones, vegetables and grains, said composition contains amino acids, proteins and saccharides as indispensable components and having a solid content of at least 5% by weight, wherein the integrated absorbance S represented by the following formula:

$$S = \int_{400}^{800} \epsilon(x)dx$$

wherein $\epsilon(x)$ represents an adsorbance at a wavelength of x nm, determined by using a cell having a thickness of 10 mm with respect to an aqueous solution having a solid concentration of 5% by weight, is not larger than 200.

Since the integrated absorbance of this composite seasoning composition is not larger than 200, coloring components and precursors thereof, not desirable for a seasoning, are removed, and components giving bad tastes and smells, derived from these coloring components, are removed.

The mixing ratio between the main oyster extract (i) and the adjuvant extract (ii) is changed according to the intended use of the seasoning, but it is generally preferred that the amount of the solid of the main oyster extract (i) be 50 to 90% by weight based on the total solids.

The adjuvant extract (ii) is formed from a fishery product such as bonito, mackerel, saurel, short-necked clam, hard-shelled mussel or scallop, a seaweed such as tangle, a chicken bone, a vegetable such as Chinese cabbage or a grain such as rice vinegar. A broth or sauce of a substance selected from the foregoing materials is used as the adjuvant extract and incorporated into the starting oyster extract, and the mixture is subjected to the predetermined adsorption and concentration treatments.

In the adjuvant extract, except an extract of a fishery product, the solid concentration is not particularly critical, but it is preferred that the solid concentration be 1 to 40% by weight, especially 2 to 20% by weight.

If the solid concentration exceeds the above-mentioned range, coloring components are formed presumably by the Maillard reaction as in the case of the main oyster extract, and if the solid concentration is below the above-mentioned range, a large quantity of the liquid should be treated, resulting in economical disadvantages. Of course, the adjuvant extract may be subjected to the adsorption refining treatment before the mixing with the main oyster extract.

Since a fishery product such as bonito, mackerel, scallop, short-necked claim or hard-shelled mussel is processed in a large quantity for the production of a canned food or choice delicacy, a soup formed at the processing or a liquid formed on thawing a frozen product by steam can be used as the adjuvant extract. An extract of tangle or chicken bone is customarily used as a broth and is easily available in large quantities. Since Chinese cabbage is a vegetable cultivated in a large quantity, a Chinese cabbage extract is easily available as a broth. Furthermore, granulated sugar may be used as a substitute of the Chinese cabbage extract.

Each of these adjuvant extracts is selected in view of the compatibility with the main oyster extract, that is, the flavor and taste of the main oyster extract, so that the inherent flavor and taste are enhanced while the characteristics of the adjuvant extract are retained. Accordingly, the composite seasoning composition is effectively used as a seasoning for Western dishes, Japanese-style dishes and Chinese dishes.

The oyster extract concentrate of the present invention does not contain black or blackish brown coloring components but has a light yellow or amber appearance, and it can be used for seasoning various optical foods. Furthermore, since bitterness, astringency, burnt smell and other bad tastes and smells are removed and gentle, mellow and delicious flavor and taste inherent to an oyster and emphasized, the oyster extract concentrate of the present invention can be used as a seasoning, a seasoning base or a seasoning assistant for all of cooked and processed foods including soups, soy-boiled vegetables and fishes, roast fishes and meats, salads, delicacies, cakes and drinks. Moreover, since the oyster extract concentrate of the present invention has a good taste and is excellent in the drinkability, it can be used as a healthy food or nutrient replenishment.

In the process of the present invention, it is sufficient if an oyster extract is contacted with the above-mentioned adsorbent at the intermediate stage of the concentration process and no particular refining treatment is necessary, the operation is simple and the treatment cost is relatively small.

The present invention will now be described in detail with reference to the following examples that by no means limit the scope of the invention.

Incidentally, in the examples, the properties were determined according to the following methods.

(1) Specific Surface Area of Adsorbent

The specific surface area of the adsorbent was measured by an automatic BET (specific surface area) measuring apparatus (Sorptomatic Series 1800 supplied by Carlo Erba).

(2) Solid Concentration in Oyster Extract

Insoluble and foreign substances in the sample oyster extract were separated by filtration using quantitative filter paper No. 5C, and the filtrate was used as the sample liquid. About 1 g of the sample liquid was charged in a weighing glass bottle having a known weight (a g) and a diameter of about 4 cm, and the weight (b g) of the sample-charged was precisely weighed. Then, the charged bottle was placed in a thermostat drier maintained at 105° C. and drying was conducted for 5 hours so that the weight was not changed. The bottle was naturally cooled in a desiccator and the weight (c g) was precisely measured.

The solid concentration (% by weight) was calculated according to the following formula:

$$\text{Solid concentration (\% by weight)} = \frac{(c - a)}{(b - a)} \times 100$$

(3) Integrated Absorbance S of Oyster Extract

Insoluble and foreign substances were separated in advance and the sample oyster extract having a known solid concentration was diluted with distilled water to a solid concentration of 5% by weight to form a sample liquid.

The absorption spectrum of the sample liquid in a wavelength region of from 400 to 800 nm was measured under conditions described below by using an automatic recording spectrophotometer (double-beam double monochrometer UVIDEC 650 supplied by Nippon Bunko Kogyo).

Reference (reference optical path): distilled water
Spectrum width: 2.00 nm
Time constant: 0.4 second
Scanning wavelength region: 800–400 nm
Wavelength scale: 40 nm/cm
Measurement scale: 0.000–5.000 absorbance
Used cell: 10 mm quartz cell The integrated absorbance is represented by the following formula:

$$S = \int_{400}^{800} \epsilon(x)dx$$

wherein $\epsilon(x)$ represents the adsorbance at x nm, determined by using a cell having a thickness of 10 mm with respect to a solution having a solid concentration of 5% by weight.

The integrated absorbance S was determined by measuring the integrated region area in the absorption spectrum diagram.

(4) Chromatogram by High Speed Liquid Chromatography

Insoluble and foreign substances were separated in advance, and the sample oyster extract having a known solid concentration was diluted with distilled water to a solid concentration of 5% by weight to form a sample liquid.

The chromatogram of the sample liquid was determined under the following conditions by using a high speed liquid chromatography apparatus (supplied by Nippon Waters Limited).

Column: TSK G2500 PWXL (hydrophilic polymer supplied by Toyo Soda)
Developing liquid: water
Flow rate: 0.8 ml/min
Pressure: 300–351 PSI
Temperature: 20° C.
Detecting device: UV (254 nm, 1.0 AUFS)
Full scale of recorder: 10 mV (5) Organoleptic Test of Flavor of Oyster Extract An oyster extract concentrate and a dilution thereof having a solid concentration of 5% by weight were used as liquid samples, and the flavor and taste of each sample were evaluated by 10 cooking experts according to the 10-points method and expressed by an average value.

EXAMPLE 1

A stainless steel vessel was charged with 1200 g of an oyster broth (having a solid concentration of 6.2% by weight), and 60 g of synthetic lamellar magnesium phyllosilicate (Mizukanite ® supplied by Mizusawa Industrial Chemicals, Ltd.) having a specific surface area of 639 $m^2/g$ was added. The mixture was stirred at 30° C. for 30 minutes and filtered by quantitative filter paper No. 5C to obtain a light-yellow transparent oyster extract (first step). A chromatogram of the obtained oyster extract was determined by the high speed liquid chromatography.

An eggplant type flask having a capacity of 2 liters was charged with 100 g of the oyster extract obtained at the first step and the extract was concentrated at a temperature of 90° C. under a reduced pressure by using a rotary evaporator (Model RE46A supplied by Yamato Kagaku) to obtain 140 g of an oyster extract concentrate having an amber color (second step).

When the solid concentration was measured, it was found that the solid concentration was 43% by weight. The integrated absorbance S of a dilution of the concentrate to 5% by weight with distilled water, the result of comparison of the chromatogram with the chromatogram shown in FIG. 5 and the flavor test result are shown in Table 2. It is seen that the obtained oyster extract has a very high commercial value.

EXAMPLE 2

A stainless steel vessel was charged with 1300 g of an oyster broth (having a solid concentration of 6.2% by weight), and 195 g of magnesium silicate (reagent class chemical supplied by Wako Junyaku) having a specific surface area of 184 $m^2/g$ was added. The mixture was stirred at 30° C. for 30 minutes and filtered by quantitative filter paper No. 5C to obtain a light-yellow transparent oyster extract (first step). A chromatogram of the obtained extract was determined in the same manner as described in Example 1.

An eggplant type flask having a capacity of 2 liters was charged with 1000 g of the oyster extract obtained at the first step and the extract was concentrated at 90° C. under a reduced pressure by a rotary evaporator to obtain 158 g of an oyster extract concentrate having an amber color.

When the solid concentration of the concentrate was measured, it was found that the solid concentration was 38% by weight. The integrated absorbance S of the concentrate, the result of comparison of the chromatogram with the chromatogram of FIG. 5 and the flavor test result are shown in Table 2. It is seen that the obtained oyster extract concentrate has a very high commercial value.

EXAMPLE 3

Synthetic lamellar magnesium phyllosilicate was mixed with active carbon at a weight ratio of 3/1 and composite reaction was carried out in the presence of water, and post treatments such as filtration, drying and pulverization were conducted to obtain a composite adsorbent powder having a specific surface area of 540 $m^2/g$.

A stainless steel vessel was charged with 1200 g of an oyster broth (having a solid concentration of 6.2% by weight), and 25 g of the obtained composite adsorbent powder was added. The mixture was stirred at 30° C. for 30 minutes and filtered by quantitative filter paper No. 5C to obtain a light-yellow transparent oyster extract (first step). A chromatogram of the obtained oyster extract determined according to the above-mentioned method is shown in FIG. 5.

An eggplant type flask having a capacity of 2 liters was charged with 1000 g of the oyster extract obtained at the first step and the extract was concentrated at 90° C. under a reduced pressure by a rotary evaporator to obtain 133 g of a viscous oyster extract concentrate having an amber color (second step).

When the solid concentration of the obtained concentrate was measured, it was found that the concentration was 45% by weight. The integrated absorbance S and the flavor test result are shown in Table 2. It is seen that the oyster extract concentrate has a very high commercial value.

EXAMPLE 4

A stainless steel vessel was charged with 1200 g of an oyster broth (having a solid content of 6.2% by weight), and 18 g of synthetic lamellar magnesium phyllosilicate (Mizukanite ® supplied by Mizusawa Industrial Chemicals, Ltd.) having a specific surface area of 639 $m^2/g$ and 6 g of active carbon (Strong Shirasagi supplied by Takeda Yakuhin) were added. The mixture was stirred at 30° C. for 30 minutes and filtered by quantitative filter paper No. 5C (first step). A chromatogram of the oyster extract was determined in the same manner as described in Example 1.

An eggplant type flask having a capacity of 2 liters was charged with 1000 g of the oyster extract obtained at the first step and the extract was concentrated at 90° C. under a reduced pressure to obtain 154 g of a viscous oyster extract concentrate having an amber color (second step).

When the solid concentration of the obtained concentrate was measured, it was found that the concentration was 39% by weight. The integrated absorbance S of the concentrate, the result of comparison of the chromatogram with the chromatogram shown in FIG. 5 and the flavor test result are shown in Table 2. It is seen that the oyster extract concentrate has a very high commercial value.

EXAMPLE 5

A stainless steel vessel was charged with 1200 g of an oyster broth (having a solid content of 6.2% by weight), and 60 g of hydrotalcite having a specific surface area of 168 m$^2$/g and 7.2 g of active carbon (Carbolafin supplied by Takeda Yakuhin) were added. The mixture was stirred at 30° C. for 30 minutes and filtered by quantitative filter paper No. 5C to obtain a light-yellow transparent oyster extract (first step). A chromatogram of the oyster extract was determined in the same manner as described in Example 1.

An eggplant type flask having a capacity of 2 liters was charged with 1000 g of the oyster extract obtained at the first step and the concentrate was concentrated at 90° C. under a reduced pressure by using a rotary evaporator to obtain 143 g of a viscous oyster extract concentrate having an amber color (second step).

When the solid concentration of the concentrate was measured, it was found that the solid concentration was 42% by weight. The integrated absorbance S of the concentrate, the result of comparison of the chromatogram with the chromatogram shown in FIG. 5 and the flavor test result are shown in Table 2. It is seen that the obtained oyster extract concentrate has a very high commercial value.

EXAMPLE 6

The oyster extract concentrate (100 g) obtained at the second step of Example 3 was placed on a glass saucer having a diameter of 30 cm and the saucer was set in a thermostat drier maintained at 105° C., and the sample was dried for 8 hours to obtain a solid oyster extract. The solid product was pulverized by a desk sample mill to obtain an oyster extract powder having an amber color.

The integrated absorbance S calculated from the absorption spectrum of a 5% by weight solution of the oyster extract powder in distilled water, the result of comparison of the chromatogram with the chromatogram shown in FIG. 5 and the flavor test result are shown in Table 2. It is seen that the oyster extract powder has a very high commercial value.

EXAMPLE 7

An eggplant type flask having a capacity of 2 liters was charged with 1200 g of an oyster broth (having a solid content of 6.2% by weight), and 18 g of synthetic lamellar magnesium phyllosilicate (Mizukanite®) supplied by Mizusawa Industrial Chemicals, Ltd.) having a specific surface area of 639 m$^2$/g and 6 g of active carbon (Strong Shirasagi supplied by Takeda Yakuhin) were added. The mixture was concentrated at 90° C. under a reduced pressure by using a rotary evaporator to obtain 211 g of a viscous oyster extract concentrate containing the adsorbent (first step).

A chromatogram of the obtained concentrate was determined in the same manner as described in Example 1.

The adsorbent was separated and removed from the concentrate obtained at the first step by a small-size centrifugal separator (5000 G) to obtain 165 g of a viscous oyster extract having an amber color (second step).

When the solid concentration of the obtained concentrate was measured, it was found that the solid concentration was 41% by weight. The integrated absorbance S of the concentrate, the result of comparison of the chromatogram with the chromtogram shown in FIG. 5 and the flavor test result are shown in Table 2. It is seen that the oyster extract concentrate has a high commercial value.

EXAMPLE 8

An eggplant type flask having a capacity of 2 liters was charged with 1200 g of an oyster broth (having a solid concentration of 6.2% by weight) and the oyster broth was concentrated at 80° C. under a reduced pressure by a rotary evaporator to obtain 300 g of an opaque brown oyster extract partial concentrate (first step).

To 300 g of the partial concentrate obtained at the first step were added 18 g of synthetic lamellar magnesium phyllosilicate (Mizukanite®) supplied by Mizusawa Industrial Chemicals, Ltd.) having a specific surface area of 639 m$^2$/g and 6 g of active carbon (Strong Shirasagi supplied by Takeda Yakuhin) just after the vacuum was returned to atmospheric pressure in the evaporator. The mixture was stirred at 30° C. for 60 minutes and the adsorbent was separated and removed by a small-size centrifugal separator (5000 G) to obtain 260 g of an oyster extract partial concentrate having an amber color and a solid concentration of 25% by weight (second step). A chromatogram of the partial concentrate was determined in the same manner as described in Example 1.

An eggplant type flask having a capacity of 1 liter was charged with 250 g of the refined partial concentrate obtained at the second step, and the partial concentrate was concentrated at 90° C. under a reduced pressure by using a rotary evaporator to obtain 152 g of a viscous oyster extract concentrate having an amber color (third step).

When the solid concentration of the obtained concentrate was measured, it was found that the solid concentration of the concentrate was 41% by weight. The integrated absorbance S of the obtained concentrate, the result of comparison of the chromatogram with the chromatogram shown in FIG. 5 and the flavor test result are shown in Table 2. It is seen that the oyster extract concentrate has a very high commercial value.

COMPARATIVE EXAMPLE 1

An oyster broth (having a solid concentration of 6.2% by weight) was filtered by quantitative filter paper No. 5C without addition of an adsorbent to obtain a starting oyster extract from which insoluble and foreign substances had been removed (first step). A chromatogram of the obtained starting oyster extract was determined in the same manner as described in Example 1.

An eggplant type flask having a capacity of 2 liters was charged with 1000 g of the oyster extract obtained at the first step and the oyster extract was concentrated at 90° C. under a reduced pressure by using a rotary evaporator to obtain 144 g of a viscous oyster extract concentrate having a blackish brown color (second step).

When the solid concentration of the obtained concentrate was measured, it was found that the solid concentration of the concentrate was 43% by weight. The integrated absorbance S of the concentrate, the result of comparison of the chromatogram with the chromatogram shown in FIG. 5 and the flavor test result are shown in Table 2. The concentrate was densely black, had bad smell and taste and was poor in the flavor.

COMPARATIVE EXAMPLE 2

A stainless steel vessel was charged with 1200 g of an oyster broth (having a solid concentration of 6.2% by weight) and 6 g of active carbon (Strong Shirasagi supplied by Takeda Yakuhin) was added. The mixture was stirred at 30° C. for 30 minutes and filtered by quantitative filter paper No. 5C. The active carbon not separated by the filtration was separated by a centrifugal separator (5000 G) to obtain a slightly blackish, light-yellow transparent oyster extract (first step).

A chromatogram of the obtained oyster extract was determined in the same manner as described in Example 1.

An eggplant type flask having a capacity of 2 liters was charged with 1000 g of the oyster extract obtained at the first step, and the oyster extract was concentrated at 90° C. under a reduced pressure by a rotary evaporator to obtain 150 g of a viscous oyster extract concentrate having a blackish brown color (second step).

When the solid concentration of the obtained concentrate was measured, it was found that the solid concentration of the concentrate was 40% by weight. The integrated absorbance S of the concentrate, the result of comparison of the chromatogram with the chromatogram shown in FIG. 5 and the flavor test result are shown in Table 2. The concentrate was densely colored and relatively poor in the flavor, and the commercial value was low.

COMPARATIVE EXAMPLE 3

A stainless steel vessel was charged with 1200 g of an oyster broth (having a solid concentration of 6.2% by weight) and 15 g of active carbon (Strong Shirasagi supplied by Takeda Yakuhin) was added. The mixture was stirred at 30° C. for 30 minutes and filtered by quantitative filter paper No. 5C, and the active carbon which was not separated by the filtration was separated by a centrifugal separator (5000 G) to obtain a transparent oyster extract having a slight yellow color (first step).

A chromatogram of the obtained oyster extract determined in the same manner as described in Example 1 is shown in FIG. 4.

An eggplant type flask having a capacity of 2 liters was charged with 1000 g of the oyster extract obtained at the first step, and the extract was concentrated at 90° C. under a reduced pressure by using a rotary evaporator to obtain 158 g of a viscous oyster extract concentrate having an amber color (second step).

When the solid concentration of the obtained concentrate was measured, it was found that the solid concentration of the concentrate was 38% by weight. The integrated absorbance S of the concentrate, the result of comparison of the chromatogram with the chromatogram shown in FIG. 5 and the flavor test result are shown in Table 2. The concentrate was poor in the flavor and taste though the coloration degree was low.

COMPARATIVE EXAMPLE 4

An eggplant type flask having a capacity of 2 liters was charged with 1200 g of an oyster broth (having a solid concentration of 6.2% by weight), and the broth was concentrated at 90° C. under a reduced pressure by a rotary evaporator to obtain 230 g of an oyster extract concentrate having a blackish brown color and a solid concentration of 35% by weight (first step).

A stainess steel vessel was charged with 200 g of the oyster extract concentrate obtained at the first step, and 19 g of synthetic lamellar magnesium phyllosilicate (Mizukanite ® supplied by Mizusawa Industrial Chemicals, Ltd.) and 19 g of active carbon (Strong Shirasagi supplied by Takeda Yakuhin) were added to the concentrate. The mixture was stirred at 20° C. for 30 minutes and the adsorbent was separated and removed by a small-size centrifugal separator (5000 G) to obtain a blackish brown oyster extract concentration (second step).

A chromatogram of the concentrate was determined in the same manner as described in Example 1.

When the solid concentration of the concentrate was measured, it was found that the solid concentration of the concentrate was 31% by weight. The integrated absorbance S of the concentrate, the result of comparison of the chromatogram with the chromatogram shown in FIG. 5 and the flavor test result are shown in Table 2. Blackish coloration was extreme, and the concentrate had bad smell and taste and was poor in the flavor.

COMPARATIVE EXAMPLE 5

A dilution having a solid concentration of 21% by weight was obtained by diluting 100 g of a commercially available oyster extract concentrate (oyster sauce produced at Hong Kong) with 100 g of distilled water. When insoluble and foreign substances were removed from the dilution by a centrifugal separator (5000 G), a brown transparent oyster sauce liquid having a solid concentration of 16% by weight was obtained. A large amount of pasty starch was obtained as the residue by the centrifugal separation.

The integrated absorbance S of a dilution obtained by diluting the obtained oyster extract to a solid concentration of 5% by weight with distilled water, the result of comparison of the chromatogram determined in the same manner as described in Example 1 with the chromatogram shown in FIG. 5 and the flavor test results are shown in Table 2. The oyster extract was densely colored and relatively poor in the flavor.

TABLE 2

| | Solid Concentration (% by weight) in Starting Liquid | Adsorbent | Solid Concentration (% by weight) in Concentrate |
|---|---|---|---|
| Example 1 | 6.2 | magnesium phyllosilicate | 43 |
| Example 2 | 6.2 | magnesium phyllosilicate | 38 |
| Example 3 | 6.2 | magnesium phyllosilicate and active carbon | 45 |

TABLE 2-continued

| | | | |
|---|---|---|---|
| Example 4 | 6.2 | magnesium phyllosilicate and active carbon | 39 |
| Example 5 | 6.2 | hydrotalcite and active carbon | 42 |
| Example 6 | | dry product of concentrate of Example 3 | |
| Example 7 | 6.2 | magnesium phyllosilicate and active carbon | 41 |
| Example 8 | 6.2 | magnesium phyllosilicate and active carbon | 41 |
| Comparative Example 1 | 6.2 | — | 43 |
| Comparative Example 2 | 6.2 | active carbon | 40 |
| Comparative Example 3 | 6.2 | active carbon | 38 |
| Comparative Example 4 | 6.2 | magnesium phyllosilicate | 31 |
| Comparative Example 5 | | commercial oyster extract concentrate (diluted to solid concentration of 5% by weight) | |

| | Integrated Absorbance S | Comparison with Chromatogram of FIG. 5 | Flavor Test Results (1) | (2) |
|---|---|---|---|---|
| Example 1 | 112 | substantially same | 9.8 | 9.7 |
| Example 2 | 159 | substantially same | 9.5 | 9.3 |
| Example 3 | 59 | (shown in FIG. 5) | 9.8 | 9.7 |
| Example 4 | 72 | substantially same | 9.8 | 9.8 |
| Example 5 | 83 | substantially same | 9.4 | 9.2 |
| Example 6 | 77 | — | 9.2 | 9.0 |
| Example 7 | 67 | substantially same | 9.3 | 9.2 |
| Example 8 | 138 | substantially same | 9.8 | 9.6 |
| Comparative Example 1 | 468 | substantially same | 5.7 | 4.1 |
| Comparative Example 2 | 231 | substantially same | 6.8 | 7.0 |
| Comparative Example 3 | 67 | peaks G and H substantially disappeared | 5.0 | 7.3 |
| Comparative Example 4 | 438 | substantially same | 6.3 | 5.0 |
| Comparative Example 5 | 240 | peaks E and F were considerably small | — | 7.9 |

Note
Flavor test (1): oyster extract diluted to a solid concentration of 5% by weight
Flavor test (2): oyster extract concentrate

EXAMPLE 9

A stainless steel vessel was charged with 1200 g of an oyster broth (having a solid concentration of 6.2% by weight), 350 g of a bonito extract (having a solid concentration of 1.17% by weight), 220 g of a chicken bone extract (having a solid concentration of 1.06% by weight) and 200 g of a tangle extract (having a solid concentration of 0.82% by weight), and 25 g of a composite adsorbent powder having a specific surface area of 540 m²/g, which was obtained by mixing synthetic lamellar magnesium phyllosilicate with active carbon at a weight ratio of 3/1, subjecting the mixture to composite reaction in the presence of water and subjecting the reaction product to post treatments such as filtration, drying and pulverization, was added. The mixture was stirred at 30° C. for 30 minutes and filtered by quantitative filter paper No. 5C to obtain a light-yellow transparent composite seasoning liquid composition (first step). Then, an eggplant type flask having a capacity of 2 liters was charged with 1000 g of the liquid composition, and the liquid composition was concentrated at 90° C. under a reduced pressure by a rotary evaporator to obtain 158 g of a viscous composite seasoning concentrate having an amber color (second step).

When the solid concentration of the concentrate was measured, it was found that the concentration was 41% by weight. The integrated absorbance S was 96, and the flavor test value (5% by weight dilution) was 9.8. It is understood that the concentrate is excellent as a composite seasoning composition.

EXAMPLE 10

A stainless steel vessel was charged with 1200 g of an oyster broth (having a solid concentration of 6.2% by weight), 400 g of a bonito extract (having a solid concentration of 1.45% by weight), 300 g of a chicken bone extract (having a solid concentration of 1.06% by weight), 250 g of a tangle extract (having a solid concentration of 0.82% by weight) and 200 g of a Chinese cabbage extract (having a solid concentration of 0.95% by weight), and 25 g of the composite adsorbent powder used in Example 9 was added. The mixture was stirred at 30° C. for 30 minutes and filtered by quantitative filter paper No. 5C to obtain a light-yellow transparent composite seasoning liquid composition. An eggplant type flask having a capacity of 2 liters was charged with 1000 g of the liquid composition, and the liquid composition was concentrated in the same manner as described in Example 9 to obtain 160 g of a viscous composite seasoning concentrate having an amber color.

When the solid concentration of the concentrate was measured, it was found that the solid concentration was 39% by weight. The integrated absorbance S of the concentrate was 92 and the flavor test value (5% by weight dilution) was 9.7.

EXAMPLE 11

A stainless steel vessel was charged with 1200 g of an oyster broth (having a solid concentration of 6.2% by weight), 500 g of a bonito extract (having a solid concentration of 1.45% by weight), 400 g of a chicken bone extract (having a solid concentration of 1.06% by weight), 300 g of a tangle extract (having a solid concentration of 0.82% by weight), 1.5 g of granulated sugar and 4.5 g of rice vinegar, and 25 g of the composite adsorbent powder used in Example 9 was added. The mixture was stirred at 30° C. for 30 minutes and filtered by quantitative filter paper No. 5C to obtain a light-yellow transparent composite seasoning liquid composition. An eggplant type flask having a capacity of 2 liters was charged with 1000 g of the liquid composition, and the liquid composition was concentrated in the same manner as described in Example 9 to obtain 165 g of a viscous composite seasoning concentrate having an amber color.

When the solid concentration of the obtained concentrate was measured, it was found that the concentration was 38.5% by weight. The integrated absorbance S of the obtained concentrate was 90 and the flavor test value (5.0% by weight dilution) was 9.8.

EXAMPLE 12

A stainless steel vessel was charged with 1200 g of an oyster broth (having a solid concentration of 6.2% by weight) and 1450 g of a bonito extract (having a solid concentration of 2.56% by weight), and 60 g of synthetic lamellar magnesium phyllosilicate having a specific surface area of 640 $m^2/g$ was added. The mixture was stirred at 30° C. for 30 minutes and filtered by using quantitative filter paper No. 5C to obtain a light-yellow transparent composite seasoning liquid composition. Then, 1000 g of the liquid composition was concentrated in the same manner as described in Example 9 to obtain 200 g of a viscous composite seasoning concentrate having an amber color.

When the solid concentration of the obtained concentrate was measured, it was found that the solid concentration was 42% by weight. The integrated absorbance S of the obtained concentrate was 89 and the flavor test value (5.0% by weight dilution) was 9.9.

EXAMPLE 13

A stainless steel vessel was charged with 1200 g of an oyster broth (having a solid concentration of 6.2% by weight), 500 g of a bonito extract (having a solid concentration of 1.45% by weight), 300 g of a chicken bone extract (having a solid concentration of 1.06% by weight), 300 g of a tangle extract (having a solid concentration of 0.82% by weight) and 300 g of a Chinese cabbage extract (having a solid concentration of 0.95% by weight), and 18 g of synthetic lamellar magnesium phyllosilicate (Mizukanite ® supplied by Mizusawa Industrial Chemicals, Ltd.) having a specific surface area of 639 $m^2/g$ and 6 g of active carbon (Strong Shirasagi supplied by Takeda Yakuhin) were added. The mixture was stirred at 30° C. for 30 minutes and filtered by quantitative filter paper No. 5C to obtain a light-yellow transparent composite seasoning liquid composition. Then, 1000 g of the liquid composition was charged in an eggplant type flask having a capacity of 2 liters and concentrated in the same manner as described in Example 9 to obtain 165 g of a viscous composite seasoning concentrate having an amber color.

When the solid concentration of the obtained concentrate was measured, it was found that the solid concentration was 38% by weight. The integrated absorbance S of the concentrate was 78 and the flavor test value (5% by weight dilution) was 9.3.

EXAMPLE 14

A stainless steel vessel was charged with 1200 g of an oyster broth (having a solid concentration of 6.2% by weight), 400 g of a bonito extract (having a solid concentration of 1.45% by weight), 300 g of a chicken bone extract (having a solid concentration of 1.06% by weight), 250 g of a tangle extract (having a solid concentration of 0.82% by weight) and 200 g of a Chinese cabbage extract (having a solid concentration of 0.95% by weight), and 18 g of synthetic lamellar magnesium phyllosilicate having a specific surface area of 639 $m^2/g$ and 6 g of active carbon were added. The mixture was concentrated at 90° C. under a reduced pressure to obtain 210 g of a viscous composite seasoning composite containing the adsorbent.

The adsorbent was separated and removed from the concentrate by a small-size centrifugal separator (5000 G) to obtain 170 g of a viscous composite seasoning concentrate having an amber color.

When the solid concentration of the obtained concentrate was measured, it was found that the solid concentration was 41% by weight. The integrated absorbance S of the concentrate was 69 and the flavor test value (5% by weight dilution) was 9.6.

EXAMPLE 15

A glass saucer having a diameter of 30 cm was filled with 200 g of the composite seasoning concentrate obtained in Example 9 and placed in a thermostat drier maintained at 105° C. Drying was conducted for 8 hours to obtain a solid oyster extract. The solid extract was pulverized by a desk sample mill to obtain a relatively dry powder of a composite seasoning composition having an amber color.

The integrated absorbance S calculated from the absorption spectrum of a solution obtained by dissolving the powder at a concentration of 5% by weight in distilled water was 78, and the flavor test value (5% by weight dilution) was 9.6.

EXAMPLE 16

To 1580 g of the composite seasoning concentrate obtained in Example 9 was added 240 g of lactose, and the mixture was sufficiently stirred to form a solution. Then, the solution was spray-dried by a spray drier (Model L supplied by Froint Sangyo) to obtain 800 g of a dry powder of a composite seasoning composition. The powder was granulated by a roller compact granulator (Model TF-MINI supplied by Froint Sangyo) to obtain 750 g of a granular composite seasoning, which was non-sticky and dry and was excellent in the water solubility.

The integrated adsorbance S calculated from the absorption spectrum of a solution formed by dissolving the granular seasoning at a concentration of 5% by weight in distilled water was 76, and the flavor test value (5% by weight solution) was 9.8.

EXAMPLE 17

In the same manner as described in Example 16, 1200 g of the composite seasoning concentrate obtained in Example 11 was spray-dried to obtain 500 g of a dry powder. Then, the powder was charged in a flow coater fluidized bed granulator (Model FL-MINI supplied by Froint Sangyo), and the powder was fluidized and an aqueous solution of 500 g of dextrin was sprayed on the fluidized powder to obtain 1100 g of a granular composite seasoning, which was non-sticky and dry and was excellent in the water solubility, as well as the product of Example 16.

The integrated adsorbance S of the granular product was 77 and the flavor test value (5% by weight dilution) was 9.7.

EXAMPLE 18

A stainless steel vessel was charged with 1200 g of a liquid (having a solid concentration of 8.5% by weight) obtained by squeezing oysters, 500 g of a bonito extract (having a solid concentration of 2.56% by weight), 400 g of a chicken bone extract (having a solid concentration of 1.06% by weight) and 300 g of a tangle extract (having a solid concentration of 0.82% by weight), and 30 g of a composite adsorbent powder having a specific surface area of 580 m²/g, which was obtained by mixing synthetic lamellar magnesium phyllosilicate with active carbon at a weight ratio of 2/1, performing composite reaction in the presence of water and carrying out post treatments such as filtration, drying and pulverization, was added. The mixture was stirred at 30° C. for 30 minutes and filtered by quantitative filter paper No. 5C to obtain a light-yellow transparent composite seasoning liquid composition. Then, 1000 g of the liquid composition was charged in an eggplant type flask having a capacity of 2 liters and concentrated in the same manner as described in Example 9 to obtain 185 g of a viscous composite seasoning concentrate having an amber color.

When the solid concentration of the obtained concentrate was measured, it was found that the solid concentration was 48% by weight. The integrated adsorbance S of the obtained concentrate was 68, and the flavor test value (5% by weight dilution) was 9.5.

EXAMPLE 19

A stainless steel vessel was charged with 1200 g of a liquid (having a solid concentration of 16% by weight) obtained by squeezing oysters and 1500 g of a tangle extract (having a solid concentration of 0.82% by weight), and 20 g of a composite adsorbent powder having a specific surface area of 600 m²/g, which was obtained by mixing synthetic lamellar magnesium phyllosilicate with active carbon at a weight ratio of 8/1, subjecting the mixture to composite reaction in the presence of water and carrying out post treatments such as filtration, drying and pulverization, was added. The mixture was stirred at 30° C. for 40 minutes and filtered by quantitative filter paper No. 5C to obtain a light-yellow transparent seasoning composition. Then, 1000 g of the composition was charged in an eggplant type flask having a capacity of 2 liters and concentrated in the same manner as described in Example 9 to obtain 210 g of a viscous composite seasoning concentrate having an amber color.

When the solid concentration of the concentrate was measured, it was found that the solid concentration was 49% by weight. The integrated absorbance S of the concentrate was 64 and the flavor test value (5% by weight dilution) was 9.8. It is seen that the product has a very high commercial value as a composite seasoning or healthy product.

EXAMPLE 20

A stainless steel vessel was charged with 1200 g of an oyster broth (having a solid concentration of 6.2% by weight), 250 g of a mackerel extract (having a solid concentration of 1.85% by weight), 300 g of a short-necked calm extract (having a solid concentration of 1.95% by weight) and 300 g of a tangle extract (having a solid concentration of 0.82% by weight), and 18 g of synthetic lamellar magnesium phyllosilicate (Mizukanite ® supplied by Mizusawa Industrial Chemicals, Ltd.) having a specific surface area of 800 m²/g and 6 g of active carbon (Strong Shirasagi supplied by Takeda Yakuhin) were added. The mixture was stirred at 30° C. for 30 minutes and filtered by quantitative filter paper No. 5C to obtain a light-yellow transparent composite seasoning liquid composition. Then, 1000 g of the liquid composition was charged in an eggplant type flask having a capacity of 2 liters and concentrated in the same manner as described in Example 9 to obtain 160 g of a viscous composite seasoning concentrate having an amber color.

When the solid concentration of the concentrate was measured, it was found that the solid concentration was 39% by weight. The integrated absorbance S of the concentrate was 75, and the flavor test value (5% by weight dilution) was 9.6.

We claim:

1. A process for the preparation of an oyster extract concentrate, which comprises subjecting an oyster extract having a solid concentration not higher than 30% by weight to an adsorption purification treatment at a temperature of 0° to 100° C. for at least 1 minute with an adsorbent composed mainly of a water-insoluble synthetic lamellar magnesium phyllosilicate, which has a specific surface area of 100 to 800 m²/g, in amount of 0.5 to 20% by weight based on the oyster extract and concentrating the refined liquid in a substantially non-oxidizing atmosphere so that the solid concentration is at least 5% by weight.

2. A process according to claim 1, wherein the magnesium phyllosilicate has a composition represented by the following formula:

$$MgO \cdot mSiO_2 \cdot nH_2O$$

wherein
m is a number of from 0.5 to 2 and
n is a number of at least 2.

3. A process according to claim 2, wherein the magnesium phyllosilicate has a composition represented by the following formula:

$$(Mg_3)(SiO_2)_2(OH)_2 \cdot xH_2O \ (x \leq 5)$$

and has X-ray diffraction peaks at spacings of 4.5~4.6 Å, 2.5~2.6 Å and 1.5~1.6 Å and a specific surface area of 300 to 800 m²/g.

4. A process according to claim 1, wherein the adsorbent comprises the magnesium phyllosilicate in amount of 0.5 to 20% by weight based on the oyster extract and active carbon in amount of 0.1 to 5% by weight based on the oyster extract.

5. A process according to claim 4, wherein the magnesium phyllosilicate and active carbon are simultaneously added.

6. A process according to claim 4, wherein the magnesium phyllosilicate and active carbon are added sequentially.

7. The extract produced by the process of claim 1.

8. A composite seasoning composition comprising:
   (i) an oyster extract formed from natural or raised oysters and produced by the process of claim 1; and
   (ii) at least one adjuvant extract selected from the group consisting of extracts of bonitos, mackerels, short-necked clams, tangles, chicken bones, Chinese cabbage and rice vinegar, said composition contains amino acids, proteins and saccharides as indispensable components and having a solid content of at least 5% by weight.

9. A composite seasoning composition as set forth in claim 8, wherein the amount of the solid of the main oyster extract (i) is 50 to 90% by weight based on the total solids.

* * * * *